March 13, 1956     W. VAN B. ROBERTS     2,738,386
MAGNETOSTRICTIVE AMPLIFIER
Filed July 17, 1951
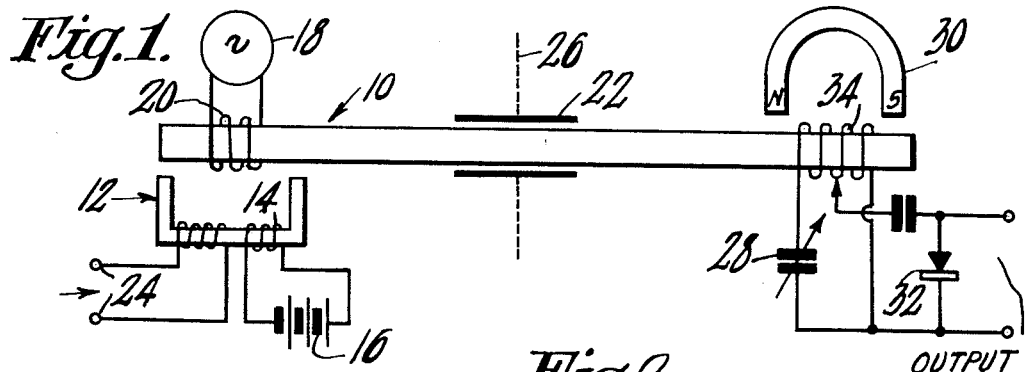
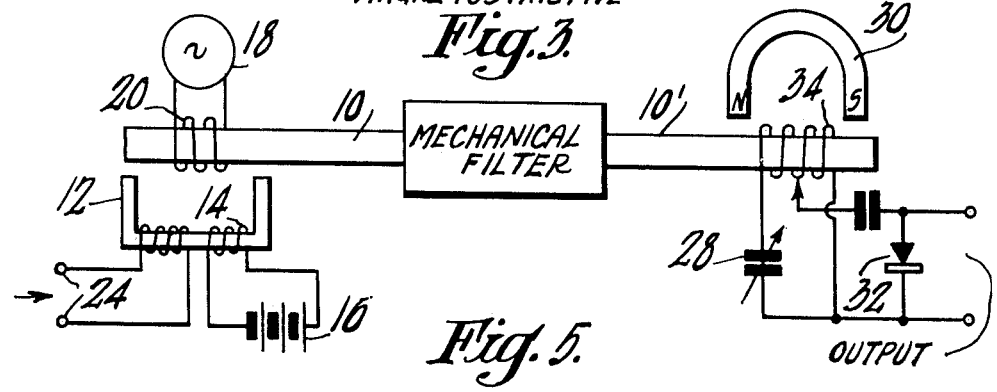
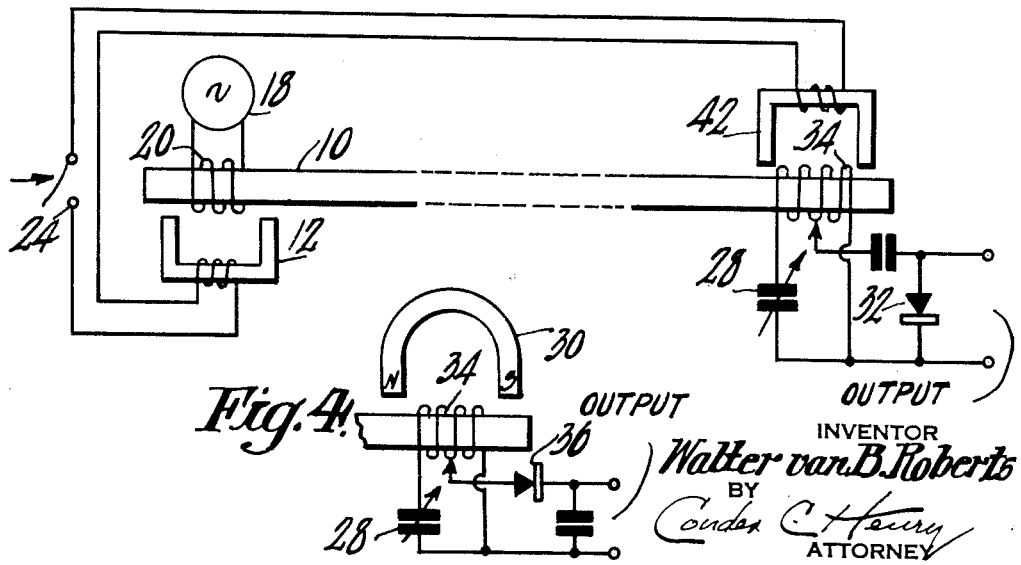
INVENTOR
Walter van B. Roberts
BY
Conder C. Henry
ATTORNEY United States Patent Office 2,738,386
Patented Mar. 13, 1956

2,738,386

MAGNETOSTRICTIVE AMPLIFIER

Walter van B. Roberts, Princeton, N. J., assignor to Radio Corporation of America, a corporation of Delaware Application July 17, 1951, Serial No. 237,127

15 Claims. (Cl. 179—171)

My invention relates to apparatus for amplifying direct and slowly varying signals, and more particularly to amplifying apparatus employing a magnetostrictive element subject to a constant physical stress whereby a magnified version of an electrical characteristic of a signal to be amplified is obtained.

It is an object of my invention to provide frequency changing means employing a sharply tuned magnetostrictive element and means for deriving therefrom a magnified version of an electrical characteristic of a signal to be amplified.

It is also an aim of my invention to provide an improved amplifying device which employs magnetostrictive elements and is of rugged and inexpensive construction.

Still another purpose of my invention is to provide an amplifier employing a single element which functions in a frequency changer as a frequency selector and by means of which a magnification of an electrical characteristic of a signal to be amplified is obtained.

In general, my invention comprises an amplifier in which a local oscillator has its output inductively coupled to one end of a magnetostrictive rod that acts as a sharply tuned mechanical filter, and in which the oscillator operates at the fundamental frequency of the rod, and also in which the resultant frequency is induced in a tuned output circuit, preferably at the other end of the rod, such tuned circuit including a rectifier, and in which a relatively low current affects the magnetization of the rod at the end where the oscillator is coupled, whereby a magnified version of an electrical characteristic of the low current is obtained from the rectifier.

The above and other objects and advantages of my invention will become apparent upon consideration of the following detailed description taken in conjunction with the accompanying drawings, in which like numerals are used to indicate like elements throughout. In the drawings, Figure 1 is a diagrammatic representation of one form of my invention, wherein a single magnetostrictive rod is employed;

Figure 2 illustrates a modification of the rod illustrated in Figure 1;

Figure 3 is a schematic diagram of another form of my invention, in which a mechanical filter is located in the center portion of the rod shown in Figure 2;

Figure 4 illustrates a modification of a part of my invention; and

Figure 5 illustrates still a further modification of my invention.

Referring in detail to Figure 1, the output of an oscillator 18, is coupled to one end of a magnetostrictive rod 10, by a coil 20. The oscillator operates at the natural mechanical frequency of the rod, and currents therefrom cause the rod to vibrate at this fundamental frequency. A tuned circuit 28, which includes a rectifier 32, is inductively coupled to the other end of the rod by a coil 34, and a magnet 30, which may be of any type but which is illustrated as a permanent magnet, is juxtaposed with respect to the coil 34, whereby the vibrations of the rod are utilized to cause a voltage to be induced in the tuned circuit. An iron core 12, is located in the vicinity of the oscillator coil, and a source of direct current 16, is coupled to such core by a coil 14, to set up a steady magnetic field therein. A source of current 24, is inductively coupled to the core. The current from the source 24 substantially affects the amplitude of vibration of the rod, and the resulting output from the rectifier is a magnified version of an electrical characteristic (current or voltage, as will be explained later) of such source. To provide shielding, I place a metal tube 22 around the center portion of the rod and employ conventional shielding as indicated by the dotted line 26.

In Figure 2 is illustrated a composite rod composed of a central metal section 50, with magnetostrictive ends 10 and 10', attached thereto. While the metal center portion is illustrated as being any desired number of half waves in length, yet one-half wavelength would be preferred. In length each of the end pieces 10 and 10' is preferably made equal to a half wavelength so that the forces at the joints will be small. The advantage of the composite construction is that it insures shielding between the magnetostrictive ends.

A modification of my invention is illustrated in Figure 3. In this figure, the oscillator 18 acts as previously described on the magnetostrictive rod 10, which rod drives the input end of a mechanical filter. The output motion of such filter drives a second magnetostrictive rod 10'. It will be understood that the mechanical filter may be designed to pass a wider band of frequencies, but at the same time have more rapid cutoff outside the pass band than is practical in electrical filters. The vibration of the second magnetostrictive rod in the presence of the field of the magnet 30 introduces a voltage in the tuned output circuit 28. In the same way, the magnetic field on the magnetostrictive element 10, is influenced by the current from the source 24. The electrical characteristic of the source which is amplified will be predominantly that of current or voltage, depending on the strength of the field of the magnet 30. The stronger the field of the magnet, the greater will be the voltage developed in the coil of the tuned circuit of Figure 1 for a given vibration amplitude of the rod. Hence, if the rectified current is permitted to flow through such coil, the field in the rod will be increased or decreased and a regenerative or degenerative action produced. This may be desirable in some cases, and Figure 4 illustrates one way to connect the rectifier to give such feedback—or inverse feedback—effect. Whether the feedback increases or decreases, the output depends upon the relation between the polarities of the rectifier 36, the winding and the magnet.

In Figure 5 is illustrated a modification of my invention in which a particular function of the input current is obtained at the output. While the input current source can be used to provide a control field at either the oscillator coil or the coil of the tuned circuit, here the current from the input current source 24, is illustrated as providing a control field at the coil 20 and also at the coil 34 by supplying magnetizing current for both the core 12 and an iron yoke 42, which replaces the magnet of Figure 1. By thus using the input current to provide both control fields, the output current will vary as the square of the input current.

In general, the output is a function of both the magnetic fields, and for weak fields the output is nearly proportional to the product of the two fields, i. e., where $B_1$ and $B_2$ are the bias fields respectively at the oscillator coil and the tuned output circuit, and $H_1$ and $H_2$ are respective corresponding fields produced at these same places by control currents, the output varies as $(B_1+H_1)(B_2+H_2)$.

In the simple D. C. amplifier, $H_2$ and $B_1$ can be omitted, in which case the output varies as $B_2H_1$.

While I have used rods as illustrating vibratory elements, it will be understood that other forms such as rings, torsion elements, and many others could be used.

What I claim is:

1. An amplifier comprising, in combination, a magnetostrictive element, a source of high frequency current magnetically coupled to one end of said element, the frequency of said source being such as to effect the vibration of said element at its natural mechanical frequency, a signal input circuit, means magnetically coupling said circuit to said element at said one end whereby the signals in said circuit influence the amplitude of vibration of said element in accordance with said signals, a tuned circuit, means magnetically coupling the other end of said element to said tuned circuit whereby corresponding alternating currents are induced in said tuned circuit, and means producing a biasing field about said tuned circuit whereby an amplified version of said signals may be obtained.

2. An amplification device comprising, in combination, a magnetostrictive element, a source of high frequency currents magnetically coupled to one end of said element, the frequency of said currents being such as to cause said element to vibrate at its natural mechanical frequency, a signal input circuit, means magnetically coupling said input circuit and said one end of said element whereby the vibration of said element is influenced by current from said input circuit, a tuned circuit, and means magnetically coupling the other end of said vibrating element into said tuned circuit whereby currents of the frequency of vibration of said element are coupled into said tuned circuit.

3. In a magnetostrictive amplifier, a magnetostrictive modulator comprising a magnetostrictive element, radio frequency current generating means magnetically coupled to said element and operating at the natural mechanical frequency of said element whereby said radio frequency currents generated by said means effect the vibration of said element at its natural mechanical frequency, a current input circuit magnetically coupled to said element, and means producing a direct current magnetic field in said element whereby the amplitude of vibration of said element is modified by the current from said input circuit.

4. In an amplifier device, a magnetostrictive modulator comprising a magnetostrictive rod, a local oscillator having its output magnetically coupled to one end of said rod, said oscillator operating at the natural mechanical frequency of said rod whereby the current from said oscillator effects the vibration of said rod at its natural mechanical frequency, a current input circuit magnetically coupled to said one end of said rod, and means magnetically coupling a direct current source to said one end of said rod for producing a magnetic field in said element at said one end of said rod whereby the current from said input circuit effectively influences the amplitude of vibration of said rod.

5. An amplifier circuit comprising a frequency changing apparatus, said frequency changing apparatus comprising a magnetostrictive element, radio frequency current generating means magnetically associated with said element at one end for effecting the vibration of said element at its natural mechanical frequency, a tuned circuit magnetically coupled to the other end of said element, means magnetically producing a biasing field about said element whereby a voltage is induced in said tuned circuit, said amplifier circuit also comprising a current input circuit, means magnetically coupling said current input circuit to said one end of said element to set up a magnetic field whereby the current from said input circuit effectively modifies the amplitude of vibration of said element, and a rectifier in said tuned circuit whereby an amplified version of the current from said input circuit is obtained.

6. A magnetostrictive amplifier comprising a magnetostrictive rod, a local oscillator operating at the natural mechanical frequency of said rod and having its output magnetically coupled to one end of said rod whereby said rod is set into vibration at its natural mechanical frequency, a tuned circuit magnetically coupled to the other end of said rod, means establishing a direct current magnetic field about said other end of said rod whereby the motion of said rod induces a voltage in said tuned circuit, a current input circuit, magnetically coupled to said one end of said rod whereby a magnetic field effected by the current from said input circuit substantially influences the amplitude of vibration of said rod, a rectifier shunting said tuned circuit whereby an amplified version of the current from said input circuit is obtained, and shielding means placed near the center of said rod.

7. An amplifier comprising, in combination, a magnetostrictive rod, a local oscillator operating at the natural mechanical frequency of said rod, the output of said oscillator being magnetically coupled to one end of said rod whereby said rod is caused to vibrate at its natural mechanical frequency, a tuned circuit having a tapped coil surrounding the other end of said rod, a magnet associated with said tuned circuit and said other end of said rod whereby the vibration of said rod magnetically induces a voltage in said tuned circuit, an input circuit for direct current, means magnetically coupled to said input circuit in the vicinity of said oscillator coupling whereby current from said input circuit effectively influences the amplitude of vibration of said rod, a rectifier shunting said tuned circuit connected to said tapped coil, the current output of said rectifier being an amplified version of the current from said input circuit, and shielding means provided near the center of said rod.

8. An amplification device comprising, in combination, a magnetostrictive rod, an oscillator operating at the natural mechanical frequency of said rod, the output of said oscillator being inductively coupled to one end of said rod whereby current from said oscillator effects magnetization of said rod and causes said rod to vibrate at its natural mechanical frequency, a tuned circuit inductively coupled to the other end of said rod, a magnet juxtaposed with said other end of said rod whereby the motion of said rod magnetically induces a voltage in said tuned circuit, an input circuit for direct current, means magnetically coupling said input circuit in the vicinity of the coupling of said oscillator whereby current from said input circuit effectively influences the amplitude of vibration of said rod, a rectifier device shunting said tuned circuit whereby an amplified version of the current from said input circuit is obtained, and shielding means located near the center portion of said rod.

9. An amplifier comprising, in combination, a first magnetostrictive element, an oscillation generator operating at the natural mechanical frequency of said element and having its output magnetically coupled to said element whereby said element is set into vibration at its natural mechanical frequency, a current input circuit, means magnetically coupling said input circuit and said element whereby the current from said input circuit affects the amplitude of vibration of said element, a mechanical band-pass filter driven by said element, a second magnetostrictive element connected to said mechanical filter whereby said second element is set into vibration, a tuned circuit magnetically coupled to said second element, magnetizing means located adjacent said second element and cooperating with the movement thereof whereby a voltage is induced in said tuned circuit, and a rectifier connected in said tuned circuit whereby current therein is changed in form so as to be an amplified version of the current from said input circuit.

10. An amplifier comprising, in combination, input and output magnetostrictive rods arranged coaxially, a mechanical band-pass filter having its input and output respectively connecting the adjacent ends of said rods whereby the vibration of said input rod is communicated to said output rod, a local oscillator having its output magnetically coupled to the input rod, said oscillator operating to effect the vibration of said rod at its natural mechanical frequency, an input circuit for slowly varying current, means magnetically coupled to said input circuit and said input rod whereby the current from said input circuit modifies the amplitude of vibration of said rod, a tuned circuit inductively coupled to the output rod, a magnet located adjacent said output rod whereby movement of said output rod induces a voltage in said tuned circuit, and a rectifier connected in said tuned circuit.

11. An amplifier comprising two coaxial magnetostrictive rods, a mechanical band-pass filter having an input and an output, the input and output of said mechanical filter respectively connecting the adjacent ends of said rods whereby the vibration of said input rod is communicated to said output rod, an oscillator operating at the natural mechanical frequency of said input rod and magnetically connected thereto whereby the current from said oscillator effectuates the vibration of said input rod at its natural mechanical frequency, a tuned circuit including a tapped coil surrounding said output rod and magnetically connected thereto, magnet means cooperating with the vibratory movement of said output rod whereby voltage is induced in said turned circuit, a rectifier connected in said tuned circuit, an input circuit, and means coupling said input circuit and said input rod whereby a magnetic field effected by the current from said input circuit substantially modifies the amplitude of vibration of said input rod.

12. In a magnetostrictive amplifier, two ferrite elements, a mechanical band-pass filter having an input and an output, said elements being connected respectively to the input and the output of said mechanical filter, a local oscillator having its output magnetically connected to said input connected element, said oscillator operating at the natural mechanical frequency of said input connected element whereby current from said oscillator effects the vibration of said input connected element at its natural mechanical frequency, said vibrating element acting through said mechanical filter to effectuate the vibration of said output connected element, a tuned circuit having a tapped coil surrounding said output connected element and magnetically connected thereto, a magnet located adjacent said output connected element whereby the cooperation of the vibration of said output connected element and said magnet induces a voltage in said tuned circuit, a rectifying device connected in said tuned circuit, an input circuit for slowly varying current, and means magnetically coupled to said input circuit and said input connected element whereby the current from said input circuit effectively modifies the magnetization of said input connected element.

13. An amplification device according to claim 7 wherein said rod consists of magnetostrictive end portions and a non-magnetostrictive metal central portion.

14. An amplifier comprising, in combination, a megnetostrictive rod, a local oscillator having its output magnetically coupled to one end of said rod for effecting the longitudinal vibration of said rod at its natural mechanical frequency, a tuned output circuit inductively coupled to the other end of said rod, a magnetizable yoke located at each end of said rod, a coil surrounding each of said yokes, an input circuit for slowly varying current, connections between said yoke coils and said input circuit whereby the current from said input circuit effects the magnetization of said yokes simultaneously and causes a voltage to be induced in said tuned output circuit, and a rectifier in said tuned circuit whereby current obtained therefrom is a desired function of the current from said input circuit.

15. In an amplifier, two magnetostrictive elements, a selective frequency responsive means connected between said elements, a source of radio frequency current coupled to one of said elements, the frequency of said source being such as to cause vibration thereof at its natural mechanical frequency, a current input circuit, said circuit coupled to said one of said elements whereby the current in said circuit influences the amplitude of vibration of said element, said vibrating element actuating said frequency responsive means whereby the other of said elements is set into vibration, a tuned circuit, and means producing a biasing field about said other element whereby the vibration of said other element induces a voltage in said tuned circuit.

References Cited in the file of this patent

UNITED STATES PATENTS

| | | |
|---|---|---|
| 2,141,277 | Nickel | Dec. 27, 1938 |
| 2,217,280 | Koch | Oct. 8, 1940 |
| 2,318,417 | Phelps | May 4, 1943 |
| 2,454,933 | Luck | Nov. 30, 1948 |
| 2,501,488 | Adler | Mar. 21, 1950 |
| 2,571,019 | Donley et al. | Oct. 9, 1951 |
| 2,574,647 | Lorenzen | Nov. 13, 1951 |